Oct. 13, 1970 KIYOSHI INOUE 3,533,925
METHOD OF AND APPARATUS FOR INCREASING THE ACCURACY
OF ELECTROCHEMICAL GRINDING PROCESS
Original Filed Dec. 5, 1966 5 Sheets-Sheet 2
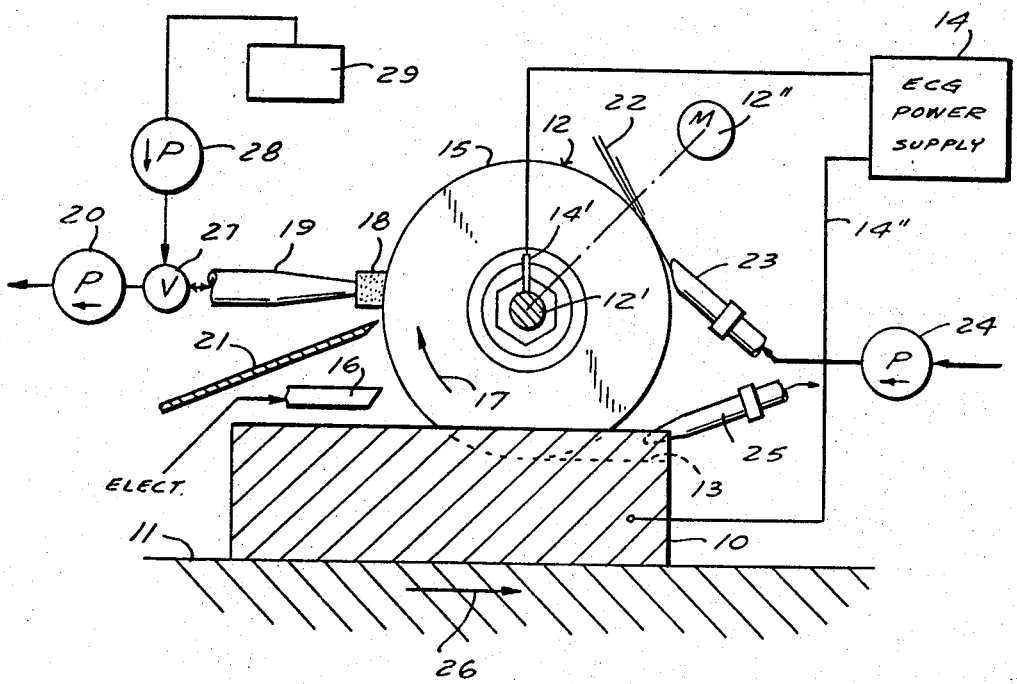
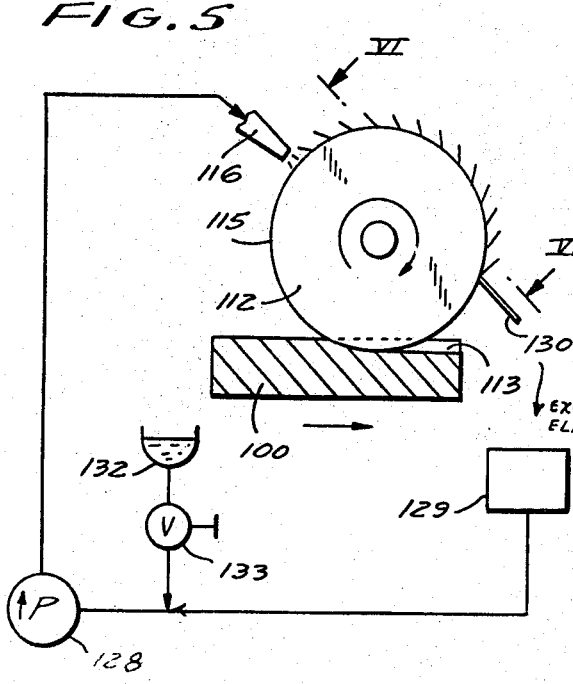
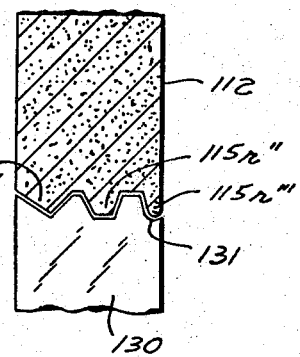
INVENTOR.
Kiyoshi INOUE
BY

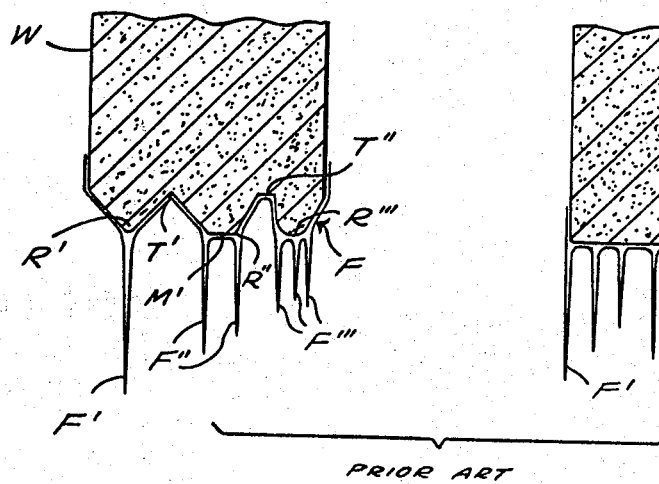
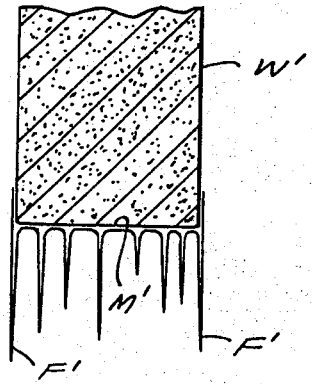
FIG. 1 FIG. 2 PRIOR ART
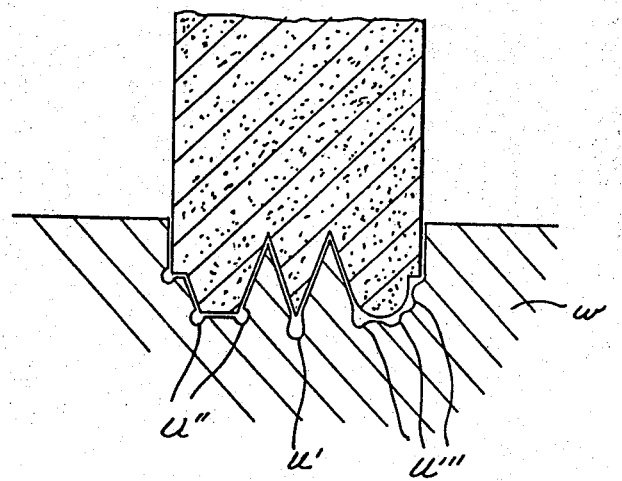
FIG. 3

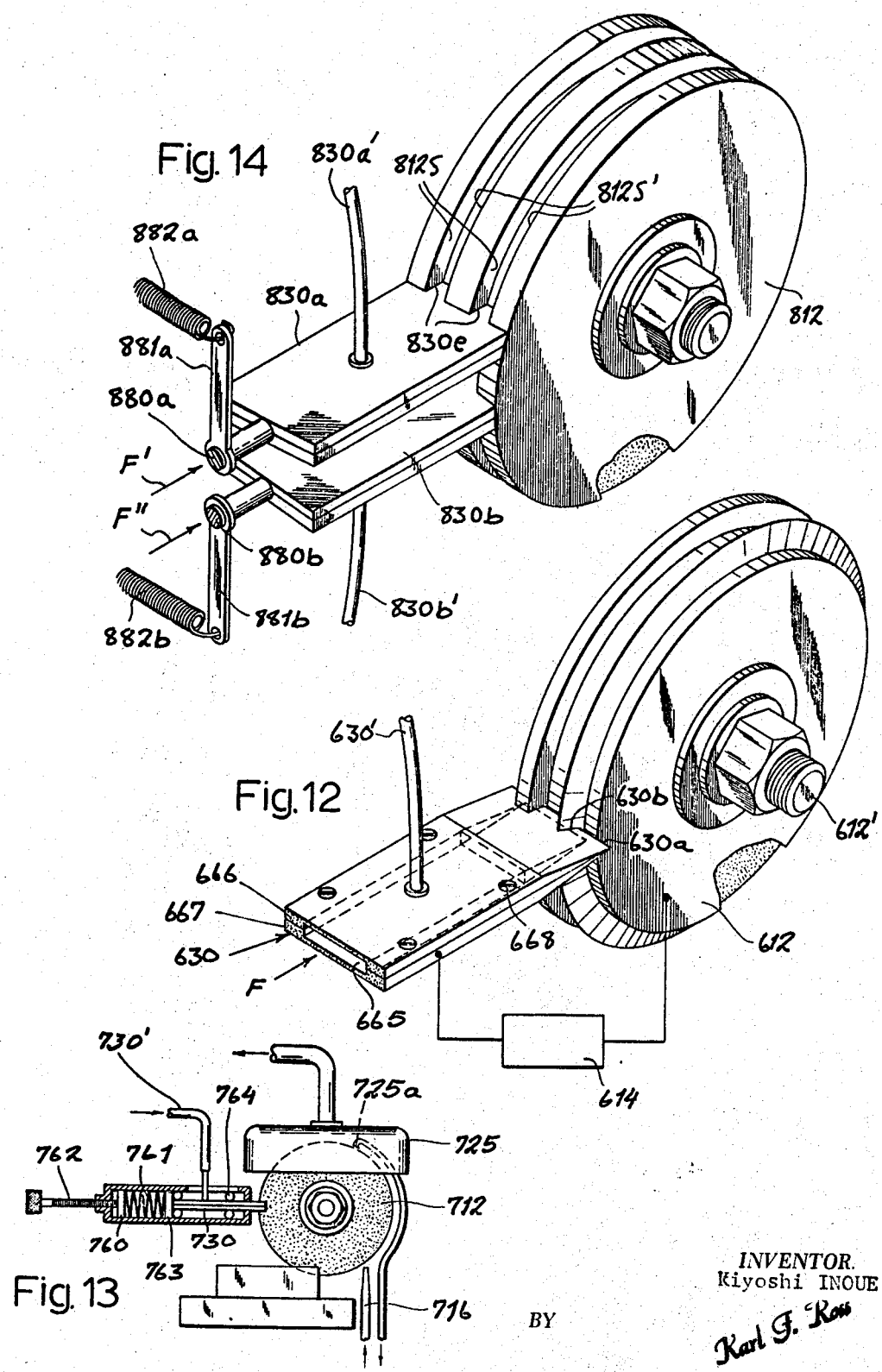

United States Patent Office 3,533,925
Patented Oct. 13, 1970

3,533,925
METHOD OF AND APPARATUS FOR INCREASING THE ACCURACY OF ELECTROCHEMICAL GRINDING PROCESS
Kiyoshi Inoue, 100 Sakato, Kawasaki, Kanagawa, Japan
Original application Dec. 5, 1966, Ser. No. 599,051, now Patent No. 3,476,662, dated Nov. 4, 1969. Divided and this application June 4, 1969, Ser. No. 830,263
Claims priority, application Japan, Dec. 16, 1965, 40/77,467; Jan. 10, 1966, 41/1,413; Jan. 29, 1966, 41/5,331; Mar. 1, 1966, 41/12,735; Mar. 2, 1966, 41/12,687; Apr. 12, 1966, 41/23,102, 41/23,103; May 7, 1966, 41/28,730; Sept. 16, 1966, 41/61,294; Sept. 24, 1966, 41/63,165
Int. Cl. B23p 1/04
U.S. Cl. 204—143                                                      4 Claims

ABSTRACT OF THE DISCLOSURE

Improved electrochemical-grinding apparatus and method whereby the accuracy of reproduction of the electrode contour in the workpiece is sharply increased by limiting the thickness of the electrolyte film carried by the grinding wheel to a minimum. The film thickness is reduced by a scraper or wiper held against the wheel, by directing a stream of high-velocity air thereagainst to dissolve the excess electrolyte, and/or by electrochemically reforming the electrolyte. The wiper may serve as an electrode for the re-formation of the electrolyte film or as the nozzle for the jet of air and is contoured complementarily to the wheel by electrochemical action or casting thereagainst. Both the wheel and the electrode are preferably composed of graphitic materials.

---

This application is a division of my application Ser. No. 599,051 filed Dec. 5, 1966 (now U.S. Pat. No. 3,476,662).

The present invention relates to a method of and an apparatus for increasing the accuracy of electrochemical-grinding (ECG) techniques and, more particularly, to improvements in electrochemical grinding affording a more accurate shaping of the workpiece, reduced tool wear, lower power consumption, and better workpiece finish.

Electrochemical-grinding techniques have been in use for many years inasmuch as electrochemical grinding is characterized by an excellent workpiece finish and an ability to machine metals of various hardnesses. In earlier electrochemical-grinding systems, a generally conductive tool (e.g. a metal-bonded diamond wheel) and the workpiece are urged together with diamond particles or other means forming a miniscule interelectrode gap through which an electrolyte is entrained as a film on the rotating tool electrode.

In my patent applications Ser. No. 512,338 (now Pat. No. 3,475,312), 535,268 (U.S. Pat. No. 3,417,006), 562,857 (now U.S. Pat. No. 3,420,759) and 565,670 (now Pat. No. 3,474,013), filed respectively Dec. 8, 1965, Jan. 19, 1966, July 5, 1966 and June 30, 1966, I have disclosed and claimed improvements in the electrochemical grinding whereby the disadvantages of diamond-containing wheels and other means for maintaining the slight interelectrode gap can be avoided. As pointed out in these applications, when the electrode and the electrolyte have approximately the same specific resistivities, one can dispense with diamond or other particles as interelectrode spacers inasmuch as the electrolyte film inherently present in the interelectrode gap and/or filling irregularities in either of the electrode surfaces conducts a substantial portion of the machining current so that electrochemical erosion is carried out in spite of the tendency of the workpiece to directly contact the electrode.

It has been found that substantially all electrochemical grinding methods are characterized by disadvantages which are only partly understood but apparently derived from the nature and character of the electrolyte in the interelectrode gap and upon the surfaces of the electrode and the workpiece.

Thus, when a high-speed rotating tool electrode is used to shape a conductive workpiece and an electrolyte flows along the periphery of the tool, undercutting at corner, angular or edge portions is a common occurrence. Such undercutting frequently exceeds the machining tolerances of the system and renders electrochemical grinding unsuitable for certain purposes. Investigations have demonstrated that there is a connection between the degree of undercutting and the characteristics of the electrolyte upon the rotating tool.

More specifically, it is believed that the current-carrying electrolyte tends to move away from the tool surface at high speeds under the centrifugal action of the rotating grinding wheel and against the surface-tension forces tending to hold the liquid electrolyte against the wheel. When ridges or grooves are to be formed in the workpiece by a correspondingly profiled wheel, therefore, the roots of the grooves tend to become channeled. Because machining takes place preferentially at the roots of the grooves, the ridges are exposed to correspondingly less machining current and may be unaffected by the electrochemical grinding action.

It is, therefore, the principal object of the present invention to provide a method of and an apparatus for increasing or improving the accuracy of electrochemical grinding (ECG) techniques.

A further object of this invention is to provide an improved method of and apparatus for extending the principles originally set forth in the copending applications mentioned earlier.

Yet another object of this invention is to provide apparatus of the electrochemical-grinding type which will afford an accuracy substantially better than any possible heretofore.

Yet another object of this invention is to provide a method of electrochemically grinding metallic workpieces affording high accuracy, improved surface finish, greater machining speed and reduced electrode wear.

Still another object of the invention is to provide an apparatus for electrochemically grinding workpieces to impart complex profiles thereto with accurate reproduction of the tool profile.

These objects and others which will become apparent hereinafter are attained, in accordance with the present invention, by a method based upon my surprising discovery that it is possible to improve manifold the accuracy of electrochemical grinding techniques by controlling the nature of the electroyte film directly upon the tool electrode. The term "controlling" when applied to the electrolyte upon the tool electrode or grinding wheel is intended to refer to modification of the composition of the electrolyte as well as to alteration of its physical character directly upon the electrode surface whereby, when the improved electrolyte is disposed within the interelectrode gap, there is surprisingly reduced tendency to undercut the workpiece, to irregularly erode the juxtaposed surfaces, etc.

According to a more specific feature of the invention and one particular aspect thereof, my process involves the stripping of excess electrolyte from the electrode surface just prior to the juxtaposition of this rotating surface with the workpiece for machining action. By "stripping" of the electrolyte, I intend to refer to the removal of all electrolyte except a thin film or a substantially monomolecular layer which remains adherent to the surface by surface-tension and like forces.

Stripping of the electrolyte can, in accordance with the present invention, be carried out in different ways, depending upon the construction of the electrode, etc. Thus, I have found that, especially when the electrode is deeply profiled, it is possible to remove excess electrolyte and form upon the machining surface of the tool electrode a relatively thin film or monolayer of electrolyte, by urging against this surface a complementarily profiled squeegee in the form of a relatively stiff thin foil. The foil, which can be of celluloid, polyethylene, polytetrafluoroethylene or other low-friction synthetic resin (uncorrodible by the electrolyte), may exert a wiping action against the surface or function as a liquid scoop to lead the excess electrolyte away from this surface. Alternatively, a thin conforming film of electrolyte may be ensured by closely juxtaposing with the machining surface a suction head adapted to siphon or aspirate excess electrolyte from the rotating machining face. It has been found that regardless of the degree of suction, sufficient electrolyte remains adherent to permit the electrochemical grinding action although practically all undercutting is eliminated. In addition to or instead of the use of suction, it is also contemplated, in accordance with the present invention, to direct a jet of high-velocity gas against the machining surface, thereby dislodging the excess electrolyte.

According to another aspect of this invention, the electrochemical grinding action is markedly improved by electrically transforming the electrolyte upon the tool electrode surface prior to entrainment of the electrolyte film into juxtaposition with the workpiece.

In accordance with this aspect of the invention, an auxiliary electrode member can be juxtaposed with the machining surface so that the film of electrolyte bridges the gap between the auxiliary electrode and the tool electrode, while circuit means applied the modifying current between this auxiliary electrode and the tool electrode. It has been found to be highly advantageous to provide, as the auxiliary electrode, a dispensing head or nozzle for the electrolyte stream, thereby ensuring that a conductive path is provided through the electrolyte jet supplied to the machining surface.

While the mechanism for the electrical transformation of the electrolyte film is not fully understood in its effect upon the machining accuracy of an electrochemical grinding action, it may be hypothesized that some form of the electrolytic decomposition, ionization, or the like occurs in the film, which transformation has a recombination or restoration time less than that required for entrainment of the transformed electrolyte into the interfacial regions.

It is also conceivable that the alternating-current energization (and especially high-frequency electrolyte activation) gives rise to a disruption of any polarization effects or to an activation at the electrolyte/electrode interface, facilitating the uniform flow of machining current between the tool electrode and the workpiece. This modification at the electrode/electrolyte interface may, moreover, improve the adhesion of the electrolyte to the tool electrode, thereby reducing undercutting. At any rate, a surprising increase in machining accuracy is observed when the film of electrolyte is treated directly upon the rotating machining surface by applying thereto a direct current, an alternating current, a high-frequency alternating current, (e.g. from the 1 kilocycle to the 3 megacycle range) or direct current upon which an alternating current of the low-frequency (e.g. 30–500 cycles per second) or high-frequency (e.g. kilocycle or megacycle range) is superimposed.

The present invention has been found to be especially suitable for use with the systems described in the aforementioned copending application wherein a graphite electrochemical-grinding wheel is employed with an electrolyte having a dynamic specific resistivity approaching that of the graphite wheel. In practice it has been found that the machining current can be direct current or alternating current, the latter apparently being effective because of the preferential erosion of the workpiece.

According to still another aspect of the present invention, the machining accuracy of the system can be improved by modifying the surface tension or surface-tension characteristics of the electrolyte film upon the machining surface. More particularly, I have found it to be advantageous to add one or more organic surfactant-forming compounds such as olive oil, asphalt oil, stearic acid, caproic acid, cetyl alcohol or the like which, when subjected to electrical modification with the auxiliary electrode mentioned above and/or when combined with the ions in the electrolyte tend to form true metal soaps or surface-active agents in situ. The presence of the surfactants appears to reduce the tendency of the electrolyte to migrate away from the tool electrode and thus serve to reduce undercutting in the manner previously described. The surfactant-forming compounds are preferably long-chain organic alcohols, acids or alkyl, aromatic or aralkyl oils.

Experiments have demonstrated that the techniques of the present invention, when applied to electrochemical grinding of complex profiles, toothed or serrated articles and the like can increase the machining accuracy up to or greater than 3½ times and yield better surface quality. In fact, the improvements described above make electrochemical grinding competitive with most die-making and machining systems as far as accuracy is concerned.

The above and other objects, features and advantages of the present invention will become more readily apparent from the following description, reference being made to the accompanying drawing in which:

FIGS. 1 and 2 are diagrammatic cross-sectional views illustrating the flow characteristics of electrolyte upon the periphery of rotating of electrochemical grinding wheels prior to this invention;

FIG. 3 is a cross-sectional view illustrating the undercutting which may result from the flow characteristics of FIGS. 1 and 2;

FIGS. 4 and 5 are diagrammatic elevational views illustrating improved electrochemical grinding systems in accordance with the present invention;

FIG. 6 is a cross-sectional view taken generally along the line VI—VI of FIG. 5;

FIG. 12 is a fragmentary perspective view showing another feature of this invention;

FIG. 13 is a diagrammatic and partially sectioned elevational view; and

FIG. 14 is a perspective cross-sectional view of another grinding system illustrating the principles of the present invention.

Figure 7:
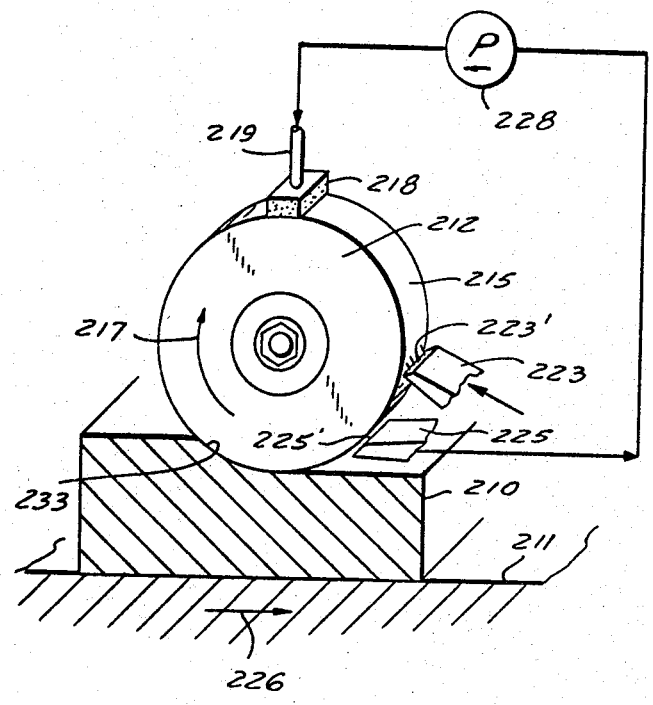
FIGS. 7 and 8 are diagrammatic and somewhat elevational views of other embodiments of the invention.

In FIGS. 1 and 2, I show diagrammatically the nature of an electrolyte film F along the machining face M of a graphite wheel W used for the electrochemical grinding of a workpiece (not shown) in accordance with any of the systems set forth in my copending applications mentioned above. The profiled wall W is formed with a series of ridges R', R" and R''' along the machining face with intermediate troughs T' and T". Ridge R' is of wedge-shaped section and tends to cast off the electrolyte film F in a relatively extended sheet F' whereas the ridge R" is flattened so that somewhat shorter sheets of electrolyte F" are cast off in the radial direction. A rounded surface such as that of the ridge R''' forms still smaller disk-like streams F''' of electrolyte. When the machining face M closely approaches a workpiece as illustrated at $w$, for example, in FIG. 3, these spurious streams of electrolyte F' to F''' appear to give rise to undercutting of the channels machined into the workpiece $w$ at U', U" and U'''.

Thus the profile of the machine surface differs materially from the profile of the contoured electrode.

As illustrated in FIG. 2, the disadvantages described above also characterize smooth surface wheels such as that at U'. Here the machining face M' is cylindrical although the electrolyte film is again nonuniform and is cast off in radial sheets F' etc. When this wheel is used to machine a workpiece with any of the systems illustrated in the aforementioned copending applications or even with conventional electrochemical grinding apparatus, surface irregularities are found in the workpiece in spite of the relative smoothness of the tool electrode. In fact, I have discovered that the roughness and inaccuracy in the surface of the workpiece derives in large measure from the nature and character of the electrolyte film.

The disadvantages discussed in connection with FIGS. 1–3 can be avoided, in accordance with one aspect of the present invention, by removing excess electrolyte from the machining face of the tool electrode and/or by applying the electrolyte thereto in such manner that a thin film of electrolyte or a monolayer only is formed uniformly along the electrode surface.

In the system of FIG. 4, a workpiece 10 is shown to be supported on a crossfeed carriage 11 of conventional construction and to be juxtaposed with an electrochemical grinder wheel 12 (e.g. of graphite). The wheel 12 is used to form a channel 13 in the workpiece and for this purpose is connected to an electrochemical grinding power supply 14 adapted to apply direct or alternating current across the wheel 12 and the workpiece 10 against which the wheel is urged.

The wheel is preferably constructed in the manner set forth in my copending application Ser. No. 565,670 of June 30, 1966, while the electrolyte recirculation apparatus, the power supply and the feed systems can be any of those described and illustrated in my applications Ser. No. 512,338 of Dec. 8, 1965, and 562,857 of July 5, 1966.

A power supply of this type is represented at 14 in FIG. 4, and has one terminal connected to a wiper 14' which, in turn, engages the shaft 12' of the grinding wheel 12. The other terminal 14" is connected with the workpiece 10.

The grinding wheel 12 has its shaft 12' driven by a motor 12" and is formed with a cylindrical machining face 15 to which the electrolyte is supplied via a nozzle 16 close to the point at which the machining surface 15 rises from the workpiece 10. The electrolyte-coated machining surface is carried in the direction of arrow 17 (i.e. clockwise) past a wiper 18 of a porous material to which a suction pipe 19 is connected.

A negative-pressure blower or suction pump 20 communicates with the line 19 so that the head 18 simultaneously wipes the electrode surface 15 and sucks excess electrolyte therefrom through the porous body 18. An apron or guide 21 below the wiper 18 conducts the squeegeed liquid away from the machining face. After the endless and continuous machining face 15 sweeps past the sponge-like suction wiper 18, a relatively thin film of electrolyte remains upon the surface.

This thin film may be further reduced by a jet of high-pressure air represented at 22 and directed from a nozzle 23 generally tangentially against the machining face 15 counter to its direction of rotation. I have found that such a jet does not decrease the uniformity of the film in the sense that one might expect but rather markedly improves the machining accuracy. In fact, the jet 22 may be used alone in the event the head 18 is omitted. A blower 24 delivers compressed air to the nozzle 23.

A further suction nozzle 25 is open toward the machining zone to collect any electrolyte which might overwise tend to accumulate there, thus insuring that only the thin film will be entrained by the tool electrode 15 through the machining zone. The workpiece 10 is displaced in the usual manner on its cross slide or the like in the direction of arrow 26 to produce the channel 13. The duct 19 can be provided with a three-way valve 27 to which an electrolyte-circulating pump 28 and a reservoir 29 of electrolyte are connected when it is desired to feed the electrolyte into the system through the porous applicator 18. In this case, only the blower 23 functions as a means for removing the excess electrolyte.

In FIGS. 5 and 6, I show another system for removing electrolyte from the surface 115 of a contoured graphite electrochemical grinding wheel 112. A nozzle 116 here delivers the electrolyte to the machining face 115 and the excess is removed by a thin synthetic resin foil 130 whose edge 131 is complementarily contoured to interfit with the ridges 115r', 115r'' and 115r''' of the wheel 112. The foil 130 is turned against the wheel 112 so as to form a scoop along which the excess electrolyte flows away from the machining face 115 prior to its engagement with the workpiece 100 to form a complementary profile 113 therein. Only a monolayer or thin film of electrolyte remains on the lower right-hand quadrant of the contoured wheel 112 as the machining surface is brought into contact with the workpiece or juxtaposed therewith adjacent this quadrant.

The foil 130 can conduct electrolyte to a reservoir 129 from which it is supplied, via the usual filters and the like, to the nozzle 116 via a pump 128. In practice, it has been found that the major part of the electrolyte applied to the surface 115 of the wheel 112 is recovered at 129 so that only a thin film remains upon the machining surface as indicated. Replenishment of the electrolyte is carried out via a supply reservoir 132 whose valve 133 feeds additional electrolyte into the circulating system in proportion to the volume of the electrolyte film withdrawn from this system. Of course, it is also possible to provide a collecting vessel for recoverable electrolyte which may run off the workpiece and, in this case, this fraction of the electrolyte is filtered and returned to the circulating path as well.

It has occasionally been found to be economical to discharge this portion of the electrolyte, however, which sustains the greatest contamination. The thin film at the machining face resulting from the wiper action of the foil 130 completely eliminates undercutting as discussed in connection with FIGS. 1–3, presumably because the electrolyte flow pattern F', F'' etc. no longer results and the electrolyte clings closely to the electrode surface.

In another modification of the present system as illustrated in FIG. 7, the workpiece 210 is fed in the direction of arrow 226 on the usual cross slide or carriage 211 while the electrochemical grinder wheel 212 is coated with electrolyte from a porous block 218. Excess electrolyte is removed from the machining surface 215 of the wheel by directing a sheet-like jet of air thereagainst counter to the direction of rotation of the wheel (arrow 217) from a nozzle 223 whose mouth 223' is the entire width of the maching face 215. Here the nozzle 223, which is connected to the blower or compressor as described in connection with FIG. 4, is located substantially at the lower right-hand quadrant and not more than 90° ahead of the workpiece or machining zone in the angular sweep of the surface 215.

Also in this zone, I provide a suction head 225 whose suction aperture 225' is closely spaced from the surface 215 while spanning the entire width of the latter. A pump 228 circulates electrolyte connected at the suction nozzle 225 and connected from the workpiece 210 to the pipe 219 supplying the electrolyte-dispensing wiper. In this case, too, the presence of only a thin film of electrolyte at the working zone 233 appears to ensure greatly improved accuracy and freedom from undercutting of the type described earlier.

According to another aspect of this invention, the electrolyte is electrolytically transformed on the workpiece surface with the aid of an auxiliary electrode just in advance of contact between the transformed film and the workpiece such that the recombination time of the transformation is substantially less than the time required to sweep the transformed portion of the electrolyte to the machining interface. For example, it may be assumed that the electrolyte consisting of a sodium-chloride solution is electrically altered to promote the formation of NaOH, ClOH, HCl, NaO⁻ or other species known to be generated in the electrolysis of sodium chloride, sodium nitrite, potassium nitrite and kindred alkali-metal salts. These species have various recombination times or decomposition periods leading toward restoration of the simple $K^+$, $Na^+$, $Cl^-$, $NO_2^-$, $NO_3^-$ and hydrated-ion condition of the electrolyte. It appears that the afore-described electrically transformed electrolyte is capable of eliminating inaccuracies resulting from undercutting of grooves and overcutting (in the sense of excess material removal). Greater reproduction accuracy of the contours of the electrochemical grinding wheel is obtained. It may be noted parenthetically that at least part of the effect of electrical transformation of the electrolyte layer on the tool electrode may derive from ohmic heating of the electrolyte and vaporization thereof to leave a reduced film thickness thereon.

Figure 8:
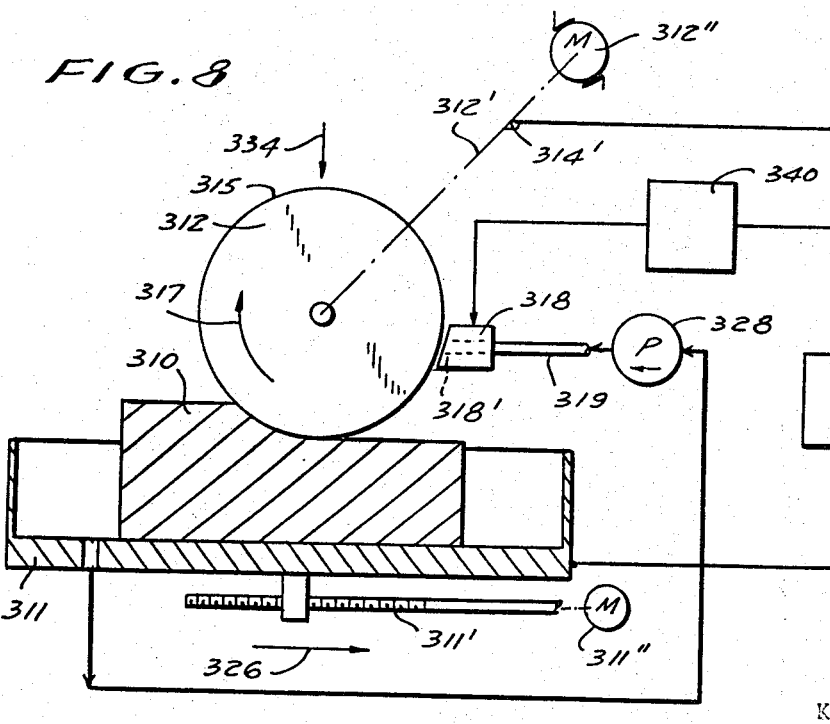

In FIG. 8, I show an electrochemical grinder having an electrolyte collection trough forming a receptacle 311 in which the metallic workpiece 310 is disposed. The trough 311 can be shifted in the direction of arrow 326 via a diagrammatically illustrated lead screw 311′ and feed motor 311″. The graphite electrochemical grinding wheel 312 is supported in a conventional head and urged against the workpiece 310 under spring or fluid pressure in the direction of arrow 334 (as described and illustrated in the aforementioned copending applications dealing with electrochemical grinding). The shaft 312′ of the wheel 312 is driven by the motor 312″ in the direction of arrow 317 so that the machining surface 315 sweeps past a discharge nozzle 318 delivering electrolyte to the face 315. A recirculation system represented by the pump 328 and the pipe 319 delivers electrolyte to the nozzle 318. The power supply 314 connected across the workpiece 310 and the wheel 312 is of the type disclosed in the above-mentioned copending applications and can be direct current, direct current superimposed upon alternating current or even alternating current. According to the present improvement, the nozzle 318 forms an auxiliary electrode whose face 318′ is closely juxtaposed with the machining face 315 of the tool electrode so that the electrolyte film between them forms a bridge and is electrically transformed directly upon the machining face. For this purpose, a further power supply 340 is connected between the wheel 312 (via its shaft 312′ and a brush 314′) and the auxiliary electrode 318. As will be apparent hereinafter, the power supply 340 may be a direct-current source so poled that the auxiliary electrode 318 is relatively positive or relatively negative or an alternating current source. The passage through the auxiliary electrode 318 thus delivers the electrolyte to the machining face.

Figure 9:
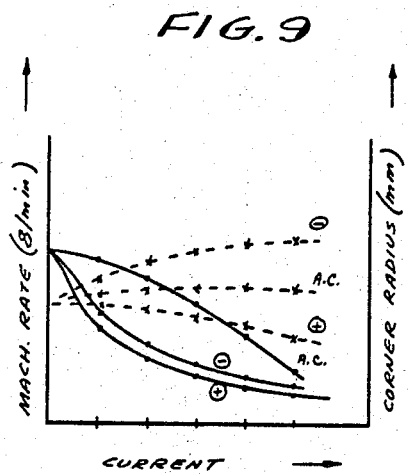
FIG. 9 is a graph showing results obtainable with the device of FIG. 8.

In FIG. 9, I show a graph of the machining characteristics as a function of the current applied between the workpiece electrode 312 and the auxiliary electrode 318. In FIG. 9, the electrolyte transformation current is plotted along the abscissa while the machining rate (broken-line curves) in grams per minute and the corner radius (solid-line curves) in mm. are plotted along the ordinate. A series of three graphs are provided in each set for the auxiliary electrode relatively negative and relatively positive (D.C. supply) and for an alternating-current auxiliary supply. The corner radius obtainable with the auxiliary electrical modification of the electrolyte (with A.C. or D.C.) is a marked improvement over any obtainable without such modification although a relatively positive auxiliary electrode provides the greatest reduction in corner radius with increase of current flow. In all cases, the accuracy increases sharply initially and tends to level out with increasing auxiliary current and at the upper current-amplitude ranges, no substantial further loss in machining speed is observed; the machining rate generally increases although a decrease is observed when the auxiliary electrode is relatively positive.

Figure 10:
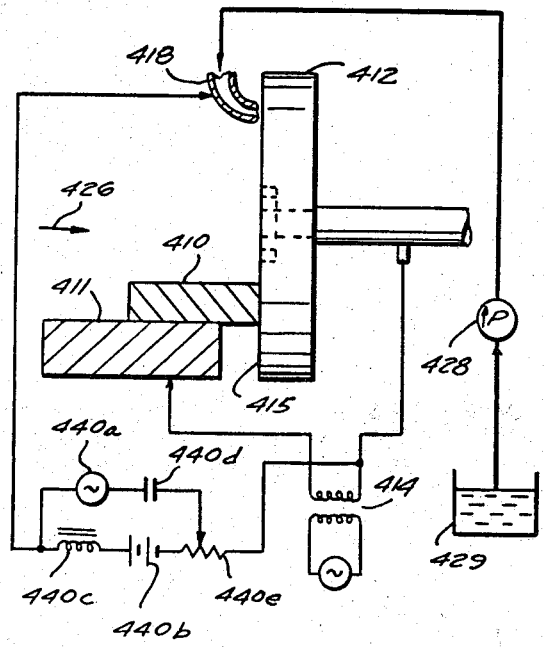
FIGS. 10 and 11 are diagrammatic elevational views of grinding systems using the flat surface of a wheel.

In FIG. 10, I show a modified electrochemical current system wherein a workpiece 410 such as a tool bit or the like is ground between the annular face 415 of a graphite electrochemical grinding tool of the type described and illustrated in my application 565,670 filed June 30, 1966. The workpiece 410 is mounted on the carriage 411 and is urged in the direction of the wheel 412 (arrow 426) via fluid- or spring-pressure means and the usual leadscrew.

The electrochemical-grinding power supply 414 is represented as a transformer connected to an A.C. line and functions as set forth in the copending applications mentioned above. Here, however, the electrolyte is delivered from a reservoir 429 via a pump 428 to the nozzle 418 which also serves as an auxiliary electrode to electrically transform the electrolyte film. For this purpose, the auxiliary power supply connected between the electrode 418 and the grinding wheel 412 comprises an alternating current source 440a capacitively bridged across a direct-current source 440b whose inductance 440c limits current surges.

The capacitor 440d is connected in series with the alternating-current source and the slider or wiper of a potentiometer 440e in series with the auxiliary electrode 418 and the tool electrode 412. The potentiometer 440e thus can be adjusted to control the amplitude of the alternating current superimposed upon the D.C. electrolyte-transforming current passing through the electrolyte film bridging the auxiliary electrode 418 and the tool electrode 412. Again, a substantial improvement in machining accuracy is obtained.

Figure 11:
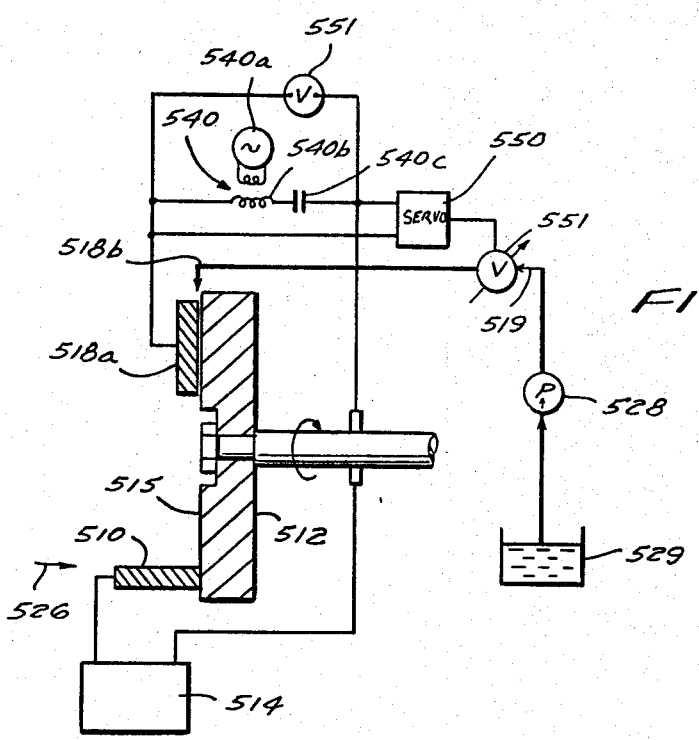

In the modified system of FIG. 11, the auxiliary electrode 518a is constituted by a graphite wiper spanning the radial width of the transverse annular machining surface 515 of the graphite wheel 512. A tool bit or other workpiece 510 to be shaped is urged in the direction of arrow 526 against the face 515 and ECG machining current is applied against the workpiece 510 and the tool electrode 512 via a source 514. The wiper 518a thus serves to mechanically remove excessive electrolyte and as the auxiliary electrode for its electrical transformation. The auxiliary current source 540 connected between the auxiliary electrode 518a and the tool electrode 512 across the electrolyte film, is constituted of an A.C. generator or line 540a connected via an isolation transformer 540b and a D.C.-blocking capacitor 540c between the auxiliary and tool electrodes. A voltmeter 551 is in parallel with the A.C. source 540 to measure the amplitude of the auxiliary voltage.

A servomechanism 550, responsive to voltage fluctuations, is connected across the auxiliary electrode 518a and the tool electrode 512 to regulate the flow of electrolyte to the dispensing nozzle 518b via the electromagnetically controlled valve 519. The circulating pump 528 delivers electrolyte to this valve from the reservoir 529. When the electrolyte film on the surface is of the proper thickness and character, it possesses a predetermined resistance so that a voltage below a predetermined peak is sensed by the servomechanism 550. When, however, the resistance rises between the auxiliary electrode 518a and the tool electrode 512, the servomechanism 550 operates the valve 519 to supply more electrolyte to the face 515 and thus correct the film thickness. When excess electrolyte is present, the reduced resistance is also sensed by the mechanism 550 which reduces the supply of electrolyte to restore the optimum film thickness and character.

In the systems of FIGS. 8–11, I have found it advisable to add long-chain alcohols, organic acids and organic oils to the electrolyte undergoing electrical transformation in the film upon the machining surface; it appears that the electrolytically produced species or fragments (e.g. KOH, NaOH and ClOH) may react chemically with these surfactant-forming organic compounds to stabilize the electrical transformation and produce surface-active agents which also favorably modify the characteristics of the electrolyte in the sense that an improved machining accuracy is obtained. In the system of FIG. 8, for example, the auxiliary electrode 318 must be located at, say, 10° above the machining zone for most machining speeds unless a transformation stabilizer is provided. Of course, the angle can be approximately doubled when the peripheral speed of the wheel is doubled, the consideration being the recombination rate of the electrochemically produced species.

The following examples illustrate how the present invention can be carried out in practice.

EXAMPLE I

Using the apparatus illustrated in FIGS. 5 and 6, a graphite electrochemical grinding wheel having a diameter of 180 mm. and a specific resistivity of $3.4 \times 10^{-3}$ ohm-cm. and a width of 20 mm. was used to grind a 0.55% (by weight) carbon steel (S55C) workpiece. The machining face of the wheel had a serrated profile with 4 teeth with apex angles of 60° each and flank heights of 3.5 mm. The peaks were, therefore, spaced apart from one another by 3.5 mm. The peripheral speed of the machining face of the wheel was 22.5 m./second and the electrolyte constituted of an aqueous solution containing 3% by weight sodium nitrite and 5% by weight potassium nitrate. The pressure applied to the electrode in urging it against the workpiece was 0.1 kg./cm.$^2$ while the machining power was 7 volts peak-to-peak (50 cycles A.C.) with a mean current of 50 amp.

A foil 130, shaped to be complementary to the configuration of the serrated wheel, was held as illustrated in FIG. 5 with a squeegee gap of 0.02 mm. was obtained whereas the corner radius was 0.07 mm. when the foil was removed. The machining speed was approximately the same in both cases.

EXAMPLE II

The apparatus illustrated in FIG. 4 was employed to machine a tungsten carbide workpiece containing 5% cobalt. The electrode was a simple cylindrical wheel having a serrated periphery as described in Example I and was urged against the workpiece with a pressure of 1.5 kg./cm.$^2$. The machining current of 80 amp. was delivered at 6 volts peak to peak (50 cycles per second A.C.). The machining depth was 5 mm. and the machining speed held at 1.6–1.8 mm./min. When no means was used to treat the film on the electrode surface, the roughness was found to be about 0.5 micron $H_{max}$ and the corner radius 0.3 mm. When, however, compressed air was directed against the tool electrode via the nozzle 23 at a pressure of 6 kg./cm.$^2$ and a nozzle/electrode gap of 1 mm., machining could be carried out at the same rate with the improved corner radius of 0.08 mm., an accuracy of 0.015 as compared with 0.07 mm. of deviation from the contours of the tool electrode.

EXAMPLE III

Using the apparatus of FIG. 8, SK–2 die steel was machined with a graphite wheel having a 1 cm.$^2$ machining area and a diameter of 150 mm. The speed of the machining surface was 23.2 m./second and 750 cc./min. of electrolyte was delivered to the machining zone. The electrolyte was an aqueous solution containing 2% by weight sodium nitrite and 5% by weight of potassium nitrate; the machining current was 70 amps of direct current. The results obtained with various auxiliary currents without the addition of surfactant formers are graphed in FIG. 9. When the auxiliary current was 100 amps (between the auxiliary electrode 318, disposed 10° above the machining zone, and the tool electrode 312), the machining rate was approximately 0.7 g./min. while a corner radius of about 0.006 mm. was observed when the electrode 318 was relatively negative. When the auxiliary power supply was alternating current, a machining speed at this auxiliary current flow of 0.5 g./min. and a corner radius of about 0.01 mm. were noted. When the electrode 7 was relatively positive, an auxiliary current of 100 amps gave about 0.005 mm. corner radius and a machining speed of about 0.38 g./min. When the auxiliary current is not applied, the corner radius is invariably greater than 0.03 mm. Thus it can be seen that it is possible to increase the machining rate and accuracy when the auxiliary electrode is relatively negative, to increase the accuracy at the expense of the machining rate when this electrode is relatively positive, and to increase the accuracy without any substantial modification of the machining rate when an alternating current is used as the auxiliary supply.

It is possible to increase the accuracy still further (i.e. to have the corner radius) when a surfactant former is supplied to the electrolyte in the amount of 0.5% by weight, the surfactant former consisting of a long-chain organic compound soluble in the electrolyte at least upon electrical modification thereof. 0.5% solutions of stearic acid, caproic acid, cetyl alcohol, olive oil and asphalt oils in the salt-containing electrolytes described yielded approximately half the corner radius obtained without surfactant former for the same auxiliary-current flow.

Referring now to FIG. 12, it can be seen that a contoured grinding wheel 612 of graphite, carried by an arbor or shaft 612′ and driven by a suitable motor for the grinding of a workpiece in systems similar to those of FIGS. 4 and 6–8, for example, co-operates with a wiper 630 whose front end 630a is tapered forwardly in the direction of the electrode 612 so that an ECG power supply 614 can be connected between the graphite wiper 630 and the wheel 612 to electrochemically machine the scraper 630 to contours 630b complementarily to the contours of the wheel 612 by rotation of the latter and the delivery of the usual machining electrolyte to the region in which the scraper 630 is held against the wheel. A spring force F urges the scraper 630 against the wheel and may be applied to the scraper by the system illustrated in FIG. 13 or any other convenient spring device. In this case, the scraper 630 is machined as a workpiece to conform to the contours of the wheel 612 prior to the machining process. In practice, therefore, the wheel 612 may be contoured by conventional dressing means initially or by casting in a mold and is thereafter used to contour the scraper 630 by electrochemical machining. Subsequently, the scraper is positioned in place of the scraper 130, for example, and machining of a workpiece carried out in the manner illustrated and described with respect to FIGS. 5 and 6. Since the forward end of the scraper 630 is tapered at 630a and thins down in the direction of the wheel 612, electrochemical machining of the scraper to conform it to the contours of the wheel 612 will be carried out preferentially with a relatively deep cut of the scraper and little, if any, erosion of the wheel.

In an alternative system, the scraper 630 can be formed by casting graphitic material against the wheel whose contours thus determine the complementary contours of the scraper. As indicated above, the scraper 630 is composed of graphite and may, therefore, serve as the auxiliary electrode for electrolytic transformation of the electrolyte. To this end, the power supply 340 may be connected between the electrode 630 and the wheel 612 or the workpiece (not shown) in the manner described in connection with FIG. 8.

EXAMPLE IV

Using a graphite electrochemical grinding electrode as previously described, with a specific resistivity in the radial direction of about $3.4 \times 10^{-3} \Omega$-cm., a thickness of about 20 mm. and a diameter of about 180 mm., electrochemical grinding of a workpiece composed of GE 885 tungsten carbide was carried out. The workpiece had a width of 30 mm. and a thickness of 12 mm. The contours of the wheel were formed by four V-shaped grooves with a flank height and separation of 35 mm. The electrolyte was an aqueous solution of 5% by weight potassium nitrate and was delivered to the wheel as illustrated in FIG. 5. The grinding wheel was rotated with a peripheral speed of 22.5 m./second and an electrochemical grinding power supply was connected between the wheel and the workpiece as illustrated in FIG. 4, to deliver a grinding potential of about 7 volts and a current of 50 amperes at a frequency of 50 cycles/second. The scraper was a graphite plate and a synthetic resin foil (cf. FIGS. 12 and 6), respectively, in a series of tests. In the following table I, list the results of five tests, comparing the maximum errors obtained with no scraper, with the improved graphite scraper at scraper pressures (against the wheel) at pressures of 400, 800 and 2200 grams/cm.$^2$ and a synthetic-resin-foil scraper of the type described in FIG. 6 at a pressure of 800 grams/cm.$^2$, for machining periods of 22 to 26 minutes and a cutting depth of 5.5 mm.

TABLE

| Test No. | Without scraper | Graphite scraper pressure | | | Foil scraper pressure 800 g./cm.$^2$ |
|---|---|---|---|---|---|
| | | 400 g./cm.$^2$ | 800 g./cm.$^2$ | 2,200 g./cm.$^2$ | |
| 1 | 0.062 | 0.031 | 0.012 | 0.013 | 0.041 |
| 2 | 0.074 | 0.042 | 0.011 | 0.011 | 0.044 |
| 3 | 0.058 | 0.028 | 0.012 | 0.012 | 0.051 |
| 4 | 0.06 | 0.033 | 0.011 | 0.012 | 0.038 |
| 5 | 0.072 | 0.03 | 0.012 | 0.011 | 0.045 |

From the foregoing results, it will be apparent that the accuracy at similar pressures of a graphite scraper contoured against the wheel is about 2–4 times greater than that of the foil scraper system and may be more than 6 times the accuracy obtainable without a scraper or wiper.

In FIG. 13, there is shown another apparatus for carrying out electrochemical grinding of a workpiece in accordance with the present invention, the wheel 712 here being provided with a hood which performs the function of the suction nozzle 25 of FIG. 4. The hood 725 recovers the electrolyte mist and returns it to the electrolyte source. Electrolyte is delivered by the nozzle 716 whereas a suction-type pickup 725a is juxtaposed with the electrode surface for rapid removal of most of the excess electrolyte. The scraper or wiper 730, which may be identical to that of FIG. 12, is carried in a housing 760 in which a spring 761, whose force is adjustable by a screw 762, bears upon a seat 763 of the wiper 730. The latter is guided by bearings 764 within the housing so that substantially all of the spring force is effective to urge the wiper 730 against the wheel 712. A pipe 730', generally similar to the pipe 630' of FIG. 12, delivers a gas (e.g. air) under pressure and at high velocity to the interface between the wiper 630, 730 and the respective wheel 612, 712. As shown in FIG. 12, the wiper 630 is formed with an internal cavity 665 communicating with the air inlet 630' and extending substantially to the tip of the wiper 630. Thus, when the contours 630b are formed in the scraper 630, the chamber 665 opens at the contact interface to permit the air jet to sweep away excess electrolyte. I have found that this chamber 665 is best formed by a pair of graphite plates 666 and 667 formed with registering and confronting recesses and which are secured together by screws 668.

EXAMPLE V

A tungsten-carbide workpiece, containing 6% cobalt, is machined with a graphite electrode wheel whose specific resistivity in the radial direction is about $10^{-3}$ Ω-cm. The workpiece has an end face of rectangular configuration with a width of 28 mm. and a height of 20 mm. The electrolyte is 5% an aqueous solution containing 5% by weight potassium nitrate and the wheel has a peripheral speed of 20 m./second, a diameter of about 25 cm. and a thickness of 28 mm. The machining current, applied as previously described between the wheel and the workpiece is 8 volts alternating current at 50 cycles/second. Prior to the machining operation, the periphery of the grinding wheel is contoured by a cutting tool. Thereafter, the electrode 630 or 730 is urged against the electrode and machined at 8 volts until the tip 630a bottoms in the roots of the recesses of the wheel. The power supply is disconnected from the electrode 630, 730 and is connected with the workpiece. The scraper 630, 730 is unhollowed. When cutting of the workpiece to the depth of 8 mm., a maximum error of 0.008 mm. is found in the reproduction of the profiles of the electrode surface in the workpiece.

EXAMPLE VI

The process of Example V is followed except that the scraper there used is replaced by a hollow scraper 630 formed by bolting together a pair of plates (FIGS. 12 and 13). The end face of the scraper is of rectangular configuration with a height of 15 mm. and a width of 35 mm. whereas the exposed chamber has a rectangular cross-section of 10 mm. x 25 mm. The profile of the scraper is formed by electrochemical grinding for 45 minutes. The scraper is urged against the wheel with a constant pressure of 3 kg./cm.$^2$ while air is forced through the scraper at a pressure sufficient to permit the air to emerge at the interface.

As the gas pressure increases from 0 to 1 kg./cm.$^2$, the accuracy increases from tolerances of 50 microns to 10–20 microns. A reproducibility of better than 10 microns is obtained with pressures between 2 and 6 kg./cm.$^2$, the interfacial gap formed by the gas corresponds at these pressures to less than 0.1 mm. It is found that substantially higher accuracy can be obtained at low-material removal rates (by comparison with Example V, for instance) or that much higher machining rates (e.g. 0.8 mm./second) can be obtained with the same accuracy.

In FIG. 14, I show a modified system wherein a pair of scrapers 830a, 830b is provided, each being of the double-plate hollow type illustrated in FIGS. 12 and 13 and being supplied with a respective gas-inlet tube 830a' and 830b' for delivery of air to the contact face. Both scrapers 830a and 830b are urged by springs such as the one shown in FIG. 13 in the direction of the arrows F' and F" against the electrode 812.

The dual-scraper arrangement of FIG. 14 is used to insure that a relatively thin film is maintained along the flanks 812f of the contours and an excess electrolyte is removed therefrom.

The plates 830a and 830b are pivoted upon respective shafts 880a and 880b and provided with arms 881a and 881b biased by spring 882a and 882b in opposite senses so that the plate 830a is urged in the counter-clockwise sense whereas the plate 830b is urged in the clockwise sense to bring the edges 830e closer to the flanks 812f of the wheel grooves.

Thus, in spite of possible inaccuracies in reproducing the contours of the wheel in the scraper, the canting of the relatively thick scrapers brings the diagonally opposite edges of the contours thereof closer to the opposite flanks of the grooves of the wheel and insures a minimum electrolyte film thickness between the scraper and a machining surface at all points along the machining face.

EXAMPLE VII

A scraper for use in Examples IV, V and VI is prepared by mixing graphite and sulfur in a weight ratio of 1:2 to 1:4, melting the mixture at a temperature between 180° C. and 160° C., and thereafter casting the melt in a mold bent around the contoured face of the electrochemical grinding wheel. Upon hardening, the plate was found to have a contour complementary to that of the wheel.

I claim:
1. In a method of electrochemically grinding a conductive workpiece wherein a rotating tool electrode and workpiece electrode are brought together in the presence of an electrolyte at least at the interface between said electrodes and an electric current is passed between said electrodes to erode electrochemically said workpiece electrode, the improvement which comprises the steps of: applying said electrolyte at least to a machining surface of said tool electrode; and increasing the accuracy of the electrochemical erosion of said workpiece by stripping excess electrolyte except for that amount which is naturally adherent from said machining surface of said tool electrode prior to juxtaposition of said machining surface with said workpiece by directing a jet of a high-velocity gas against said machining surface ahead of said interface.

2. The method defined in claim 1 wherein excess electrolyte is removed from said tool electrode by directing a sheet-like jet of high-velocity gas against said machining surface across the entire width thereof and at an angle to said machining surface.

3. The method defined in claim 2 wherein said jet is directed tangentially to said tool electrode in a direction counter to the sense of rotation thereof.

4. The method defined in claim 1, further comprising the step of adding a surfactant-forming organic compound to said electrolyte.

References Cited

UNITED STATES PATENTS

| | | | |
|---|---|---|---|
| 3,172,831 | 3/1965 | Williams | 51—273 |
| 1,062,248 | 5/1913 | Mueller | 51—273 |
| 2,739,935 | 3/1956 | Kehl et al. | 204—224 |
| 2,899,781 | 8/1959 | Williams | 204—224 |
| 2,939,825 | 6/1960 | Faust et al. | 204—143 |
| 3,008,892 | 11/1961 | Owen | 204—224 |
| 3,058,895 | 10/1962 | Williams | 204—224 |
| 3,061,529 | 10/1962 | Crompton | 204—224 |

JOHN H. MACK, Primary Examiner

S. S. KANTER, Assistant Examiner